(12) United States Patent
Matsuoka et al.

(10) Patent No.: US 8,126,511 B2
(45) Date of Patent: Feb. 28, 2012

(54) RADIO COMMUNICATIONS SYSTEM FOR DETECTING AND MONITORING AN EVENT OF A DISASTER

(75) Inventors: Hironao Matsuoka, Kodaira (JP); Katsuyuki Nakano, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 560 days.

(21) Appl. No.: 11/662,201

(22) PCT Filed: Dec. 5, 2005

(86) PCT No.: PCT/JP2005/022708
§ 371 (c)(1),
(2), (4) Date: May 9, 2007

(87) PCT Pub. No.: WO2006/062213
PCT Pub. Date: Jun. 15, 2006

(65) Prior Publication Data
US 2007/0254716 A1    Nov. 1, 2007

(30) Foreign Application Priority Data
Dec. 7, 2004  (JP) .................................. 2004-354065

(51) Int. Cl.
*H04M 1/00* (2006.01)
(52) U.S. Cl. .................. 455/561; 455/404.1; 455/67.13
(58) Field of Classification Search .................. None
See application file for complete search history.

(56) References Cited

U.S. PATENT DOCUMENTS

| 7,027,719 | B1 * | 4/2006 | Schneider et al. | 386/109 |
| 7,035,897 | B1 * | 4/2006 | Devereaux et al. | 709/203 |
| 7,131,136 | B2 * | 10/2006 | Monroe | 725/105 |
| 7,561,038 | B2 * | 7/2009 | Johan et al. | 340/531 |
| 2004/0075738 | A1 * | 4/2004 | Burke et al. | 348/143 |
| 2006/0274828 | A1 * | 12/2006 | Siemens et al. | 375/240.01 |
| 2007/0216771 | A1 * | 9/2007 | Kumar | 348/148 |

FOREIGN PATENT DOCUMENTS
JP      10-285585    10/1998
JP      10285585 A  * 10/1998
(Continued)

OTHER PUBLICATIONS

Notification of Reason for Refusal (in English language) from the Japan Patent Office, issued Apr. 28, 2009, in Japanese Application No. 2004-354065.

(Continued)

*Primary Examiner* — Willie J Daniel, Jr.
(74) *Attorney, Agent, or Firm* — Wenderoth, Lind & Ponack, L.L.P.

(57) ABSTRACT

A radio communications system that shows the full effect for responding to the event of a disaster is provided. In a terminal station device, an imaging means captures an image; a composition information management means manages information about a composition for imaging; and a terminal station transmission means transmits, by radio, to a base station device, information about the captured image and the information about the composition. In the base station device, the base station reception means receives the information transmitted, by radio, from the terminal station device. In the center station, a display means displays, with a correlation, the information about the image and the information about the composition transmitted by the terminal station device based on the information received by the base station device.

6 Claims, 4 Drawing Sheets

FOREIGN PATENT DOCUMENTS

| | | | |
|---|---|---|---|
| JP | 2000-228790 | | 8/2000 |
| JP | 2000228790 | * | 8/2000 |
| JP | 2001-255181 | | 9/2001 |
| JP | 2001255181 | * | 9/2001 |
| JP | 2002-027440 | | 1/2002 |
| JP | 2002-099325 | | 4/2002 |
| JP | 2003-187354 | | 7/2003 |
| JP | 2004-186987 | | 7/2004 |

OTHER PUBLICATIONS

Notification of Reason for Refusal (in English language) from the Japan Patent Office, issued Oct. 17, 2008, in Japanese Application No. 2004-354065.

Notification of Reasons for Refusal issued Apr. 15, 2010 in corresponding Japanese Application No. 200580029478.6.

* cited by examiner

RADIO COMMUNICATIONS SYSTEM FOR DETECTING AND MONITORING AN EVENT OF A DISASTER

BACKGROUND OF THE INVENTION

I. Technical Field

The present invention relates to a radio communications system such as broadcast radio system and, more specifically, to a radio communications system showing the full effect for responding in the event of a disaster, or others.

II. Description of the Related Art

For example, as a radio communications system, a digital simultaneous Radio communication system (for county/city/town) or others have been under study or others. The digital simultaneous Radio communication system is defined by a digital simultaneous Radio communication system recommended standard issued by the Ministry of Internal Affairs and Communications, and an ARIB Standard-T86 digital simultaneous Radio communication system standard (hereinafter, referred to as ARIB STD-T86) is a standard specification in Japan issued by the Association of Radio Industries and Businesses (ARIB: Association of Radio Industries and Businesses).

FIG. 7 shows a first exemplary configuration of a digital simultaneous Radio communication system.

Note here that any device similar to that of FIG. 1 of an example that will be described later is under indicated by the same reference numeral, but there is no intention of unnecessarily restricting the invention.

By referring to FIG. 7, described is a the selection of compositions by a monitor camera 3 for imaging is described.

By referring to FIG. 7, described is a selection of compositions by a monitor camera 3 for imaging.

Signal format data A11, A12, and A2 are defined by ARIB STD-T86.

For the collection of image information, data B2 is added for a collection request of image information in addition to a terminal ID number B1 of the signal format data A11, which is sent out when a central station 1 calls a terminal 2. When the terminal 2 determines that the terminal ID number B1 corresponds to the number of its own, the terminal establishes a line connection. After a line connection is established, the central station 1 sends out, together with the signal format data A12, preset data B3 indicating information about imaging composition of the monitor camera 3, which is connected to the terminal 2. The terminal 2 transfers the preset data B3 together with the signal format data A12 to a control section 12 of the monitor camera 3, and then automatically adjusts the orientation of the monitor camera 3 and the scaling factor of a lens to suit the imaging composition defined by the preset data B3. The terminal 2 transfers preset image information C1 to the central station 1 using the signal format data A2. In the central station 1, the received image information C1 is displayed on a display section 11.

FIG. 5 shows a second exemplary configuration of the digital simultaneous Radio communication system.

Note here that FIG. 5 is to be used in the section of the Detailed Description of the Invention that will be described later, and herein, there is no intention of unnecessarily restricting the invention.

In the digital simultaneous Radio communication system of FIG. 5, for example, when a telemeter central station device 44 acknowledges information indicating that the water of a river is exceeding a certain warning level, the fact is output, as characters and letters, to a recording paper of a printer or others.

Related Art: 1) JP-A-8-65551; 2) JP-A-2000-99860; 3) JP-A-2003-308581 4) JP-A-2002-27440; 5) JP-A-9-27094; and 6) ARIB STD-T86 digital simultaneous Radio communication system, Association of Radio Industries and Businesses.

SUMMARY OF THE INVENTION

The problem is that the previous digital simultaneous Radio communication system is still deficient in many respects, e.g., response in the event of a disaster, and there thus has been a demand for a further development.

In the below, specific examples are shown.

In the first exemplary configuration of FIG. 7, as a selection of compositions by the monitor camera 3 for imaging, the central station 1 is exercising control over the orientation of the monitor camera 3 and the scaling factor of the lens (telephoto and wide-angle) by sending out the preset data B3 after the line connection is established with the terminal 2. There thus is a problem of not being able to receive in real time, for display, images of the site of a disaster.

In the second exemplary configuration of FIG. 5, a telemeter, an image transmission device, and a map display panel are each individually operated in terms of function and manipulation. For example, even if the telemeter central station device 44 acknowledges information indicating that the water is exceeding a certain warning level, such a fact is only output, as characters and letters, to a recording paper of a printer or others. There thus is a problem that a plurality of people cannot share the information in an instant. This thus results in, especially, considerably a long time for operation running, e.g., immediately understanding any warning-required information based on a measurement value of the telemeter, and initiating some kind of action thereafter.

The present invention is proposed to solve such previous problems, and an object thereof is to provide a radio communications system that shows the full effect for responding in the event of a disaster, or others.

In order to achieve the object, a radio communications system of the invention includes a center station, a base station device connected to the center station, and a terminal station device that communicates, by radio, with the base station device, and the system goes through the following processes.

That is, in the terminal station device, imaging means captures an image, composition information management means manages information about a composition for imaging by the imaging means, and terminal station transmission means transmits, by radio, to the base station device, information about the captured image and information about the composition.

In the base station device, base station reception means receives the information transmitted, by radio, from the terminal station device.

In the center station, display means displays, with a correlation, the information about the image and the information about the composition transmitted by the terminal station device based on the information received by the base station device.

Accordingly, because the information about the captured image is correlated, for display, to the information about the composition for the imaging, this enables anyone looking at the resulting image to understand the composition at the same time, thereby leading to the full effect for responding in the event of a disaster, or others.

Herein, the center station, the base station device, and the terminal station device may each vary in configuration.

Further, the means equipped to the devices may be provided inside of each corresponding device, or may be provided outside thereof, for example.

Still further, an object for imaging may vary in type, and exemplarily used is a site for monitoring an event of a natural disaster or any other disaster, e.g., a river that possibly causes a natural disaster.

Still further, the information about the composition for imaging may vary in type, and exemplarily used are various types of setting information such as the orientation of a camera for use as the imaging means or the scaling factor of a lens, information about the location, the direction, the name, and others of an imaging object, information about the location of the devices or the means related to imaging, identification information of the devices or means related to imaging, and others.

Note here that when information A and information B are correlated to each other, the information A and B may be arbitrarily exchanged in any stages of various types of processes, e.g., detection, transmission, reception, and display.

The means for managing the information about a composition may vary in type, and exemplarily used is means for storing information about the composition, means for making a setting to the imaging means based on the information about the composition, or others.

Moreover, as a format of displaying the information about an image and the information about a composition with a correlation therebetween, for example, possibly considered are a format of displaying the information in the same screen, a format of displaying the information in the same frame, a format of displaying the information in a close range, a format of displaying one information on a screen provided separately from a screen for displaying the other information but a link is established therebetween, and others.

As an exemplary configuration, the radio communications system of the invention goes through the following processes.

That is, in the terminal station device, telemeter means detects an occurrence of a predetermined abnormal condition.

In the terminal station device, in response when the occurrence of the abnormal condition is detected, the imaging means captures an image related to the occurrence of the abnormal condition, and in response when the occurrence of the abnormal condition is detected, the terminal station transmission means transmits, by radio, to the base station device, the information indicating the occurrence of the abnormal condition, and the information about the captured image related to the occurrence of the abnormal condition.

Accordingly, when the occurrence of an abnormal condition is detected in the terminal station device, the occurrence of the abnormal condition is notified to the base station device end together with an image thereabout. Therefore, utilizing such information, the center station on the base station device end can show the full effect for responding in the event of a disaster, for example.

Herein, the object for use in detecting the occurrence of a predetermined abnormal condition may vary in type, and exemplarily used is a measurement value for estimating the possible occurrence of a natural disaster or any other disaster, e.g., the water level of a river possibly causing a natural disaster.

The manner of determining whether an abnormal condition is occurring or not may vary in type, and exemplarily used are the manner of determining that an abnormal condition occurs when a measurement value is increased or decreased compared with a predetermined threshold value, the manner of detecting the occurrence of an abnormal condition based on any change observed as a result of processing data of a captured image, and others.

The image related to the occurrence of an abnormal condition may be an image of the site where the abnormal condition occurs, or an image therearound.

The information indicating the occurrence of an abnormal condition may vary in type, and exemplarily used is information indicating only the occurrence of some abnormal condition with no specification about the details thereabout, or information indicating the occurrence of an abnormal condition together with information specifying one or more of a measurement value, the time, the type, the site, and others about the occurrence of the abnormal condition.

As an exemplary configuration, the radio communications system of the invention goes through the following processes.

That is, in the center station, based on the information received by the base station device, the display means displays information about the occurrence of the abnormal condition, and information about a map including the site related to the occurrence of the abnormal condition.

Therefore, when the occurrence of an abnormal condition is detected in the terminal station device, the center station displays the occurrence of the abnormal condition and a map including the site thereof. This thus enables an offerance of the information about the site of the abnormal condition together with the occurrence thereof, thereby leading to the full effect for responding in the event of a disaster, or others.

Herein, the information about the occurrence of an abnormal condition may vary in type, and exemplarily used is information indicating the fact about the occurrence of an abnormal condition, a measurement value, the time when the abnormal condition occurs, the degree of abnormality, the type of abnormality, the condition of abnormality, the image when the abnormal condition occurs, and the like.

The site related to the occurrence of an abnormal condition may be the site where the abnormal condition occurs, or the location of the devises or means related to the occurrence of the abnormal condition, e.g., the terminal station device detecting the occurrence of the abnormal condition, the camera, or the telemeter.

A radio communications system of the invention includes a center station, a base station device connected to the center station, and a terminal station device that communicates, by radio, with the base station device, and the system goes through the following processes.

That is, in the terminal station device, telemeter means detects the occurrence of a predetermined abnormal condition, and in response when the occurrence of the abnormal condition is detected, terminal station transmission means transmits, by radio, to the base station device, information indicating the occurrence of the abnormal condition.

In the base station device, base station reception means receives the information transmitted, by radio, from the terminal station device.

In the center station, display means displays, when the information indicating the occurrence of the abnormal condition is provided by the terminal station device, based on the information received by the base station device, information about a map indicating the site related to the occurrence of the abnormal condition.

Accordingly, when the terminal station device detects the occurrence of an abnormal condition, the center station displays a map indicating the site related to the occurrence of the abnormal condition. When an abnormal condition occurs, the site can be thus indicated on the map, thereby leading to the full effect for responding in the event of a disaster, or others.

Herein, for example, the site related to the occurrence of an abnormal condition is explicitly indicated on the map with a distinction from other sites by being flashed, illuminated, colored, differently colored, and others.

As an exemplary configuration, the radio communications system of the invention goes through the following processes.

That is, in the center station, based on the information received by the base station device, center station transmission means transmits, to another predetermined terminal station device via the base station device, when the information about the occurrence of an abnormal condition is provided by the terminal station device, the information indicating the occurrence of the abnormal condition.

Accordingly, when a certain terminal station device detects the occurrence of an abnormal condition, the center station notifies other terminal station devices of the fact so that the occurrence of an abnormal condition can be swiftly informed to any person in charge. As such, this leads to the full effect for responding in the event of a disaster, or others.

Herein, a predetermined terminal station device being an object to be notified of the occurrence of an abnormal condition may vary in type. For example, identification information of a terminal station device being a notification target is set to the center station or others in advance, or identification information of a terminal station device being a notification target is specified by a terminal station device taking in charge of detecting the occurrence of an abnormal condition and transmitting information thereabout.

DETAILED DESCRIPTION OF THE INVENTION

By referring to the accompanying drawings, examples of the invention are described.

In this example, exemplified is a case where the invention is applied to a digital simultaneous Radio communication system.

The digital simultaneous Radio communication system of this example includes a center station (central station) provided with an operation desk, at least one base station device and a relay station device connected to the center station, and a plurality of terminal station devices (terminals). The terminal station devices are disposed in the areas of county, city, town, and others, or used as portables, and therewith, information about a disaster such as flood or earthquake and information about disaster prevention is broadcast from the center station end to the terminal station end, and image information provided by the terminal station end about a disaster is received at the center station end for storage, for example.

Herein, the terminal station device is disposed where there is a possibility of a disaster, where people gather, facilities such as shelters, city halls, and elementary and junior high schools, for example.

The terminal station device sometimes includes a loudspeaker that increases the level of any received audio for output.

The center station and the terminal station devices is possibly connected together via various types of lines, e.g., radio channel, LAN (Local Area Network) channel, general telephone line, and the Internet channel.

The center station is provided with a disaster prevention information server, for example, for accumulation (storage) of image information, weather information, disaster information, damage information or others collected from the terminal station devices. Such information can be utilized to keep track of and analyze the condition of the disaster, the occurrence likelihood of a nature disaster in the future, and others.

The image information may vary in type, and may be moving images, frame-by-frame images, and still images. Image information compressed by JPEG or MPEG may be also used for communications or stored.

FIRST EXAMPLE

Described now is a first example of the invention.

Figure 1:
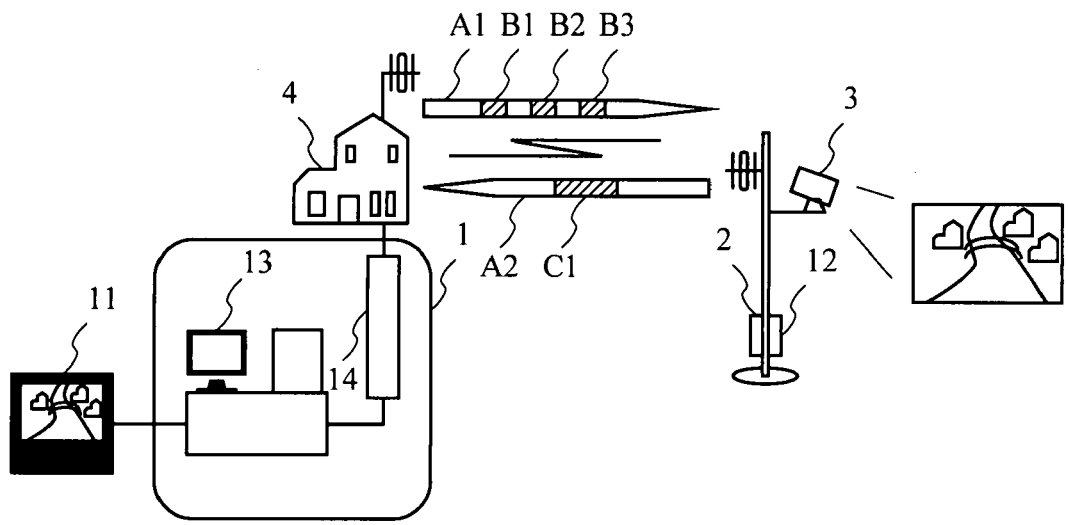
FIG. 1 is a diagram showing an exemplary configuration of a digital simultaneous Radio communication system according to a first example of the invention.

FIG. 1 shows an exemplary configuration of a digital simultaneous Radio communication system of this example.

The digital simultaneous Radio communication system of this example includes the central station (center station device) 1, the terminal (terminal station device) 2, the monitor camera 3 such as digital camera, a base station device 4, the display section 11 connected to the central station 1, and the control section 12 of a monitor camera 12.

The central station 1 includes an operation desk 13 and a communications control section 14.

The display section 11 may vary in type, and exemplarily used is a large-sized display available for many people to see.

The central station 1 communicates, by radio, with the terminal 2, and makes the display section 11 display and output the received image information. The display section 11 has a screen, and displays and outputs the image information to the screen. The display section 11 is also capable of audio output.

The monitor camera 3 is disposed to an upper portion of a high pillar, for example, and captures an image (video) of a river or others using the orientation and scaling factor whatever set. The control section 12 exercises control over the monitor camera 3 in terms of orientation, scaling factor, and others.

The terminal 2 communicates, by radio, with the central station 1, and takes charge of transmitting information about the image captured by the monitor camera 3, making the control section 12 to change the setting made to the monitor camera 3 in accordance with a command coming from the central station 1, and others.

Note here that, in the central station 1, in response when an operator (person) operates the operation desk 13, various settings can be made for the system or control is exercised thereover. The radio communications with the terminal 2 is performed via the base station device 4 under the control of the communications control section 14. The base station device 4 transmits/receives a signal to/from the communications control section 14 of the central station 1, and transmits/receives, by radio, a signal to/from the terminal 2. Moreover, a relay station device may be provided for use to relay the radio communications between the base station device 4 and the terminal 2.

FIG. 1 is showing an exemplary communications procedure of, when the digital simultaneous Radio communication system of this example collects image information, the central station 1 before collecting any target image information for display after calling the terminal 2. In this example, when the central station 1 calls the terminal 2, applied is a method of adding a signal with preset data. When calling the terminal 2, the central station 1 accepts inputs or selection from a plurality of items made by an operator (person), i.e., a terminal ID number being a calling target, and information about an imaging composition of the monitor camera 3. Based thereon, a calling operation is started for the specified terminal 2.

By referring to FIG. 1, an exemplary operation is described.

Note here that, as the signal format data, used is the one defined by ARIB STD-T86 or the one modified based thereon.

For collection of the image information, to the signal format data A1 sent out from the central station 1 when it calls the terminal 2, in addition to the terminal ID number B1, added is collection request data B2 of the image information and preset data B3 indicating information about an imaging composition of the monitor camera 3 connected to the terminal 2 that is to be called.

When the terminal 2 determines that the terminal ID number B1 included in the received signal format data A1 is the same as the ID number of its own, i.e., the station device 2, thereafter, through acknowledgement of the collection request data B2 of the image information added to the signal format data A1, the preset data B3 of the monitor camera 3 added to the signal format data A1 is transferred to the control section 12 of the monitor camera 3. In this manner, the control section 12 automatically adjusts the orientation of the monitor camera 3, the scaling factor of the lens, and others, to suite the imaging composition specified by the preset data B3. Thereafter, the terminal 2 transfers, to the central station 1, using the signal format data A2, the image information C1 acquired by the monitor camera 3 whose imaging composition is adjusted through such presetting.

The central station 1 displays, on the display section 11, the image information C1 received from the terminal 2.

In this example, when transmitting the image information acquired by the monitor camera 3 to the central station 1, the terminal 2 transmits theretogether the preset data indicating the information about the imaging composition of the monitor camera 3. This enables the central station 1 to display the received image information with a correlation to the composition information about the monitor camera 3 when it is acquired.

Moreover, in this example, when the monitor camera 3 is connected with a telemeter (telemetering system), and when a water level gauge of the telemeter detects any abnormal condition of a river or others, the monitor camera 3 responsively captures an image of the river or others. When some abnormal condition occurs, the terminal 2 adds information indicating the occurrence of the abnormal condition to the image information derived by the monitor camera 3, and transmits the addition result to the central station 1. This enables the central station 1 to acknowledge the occurrence of the abnormal condition, and to acquire the image thereof.

Herein, the telemeter is including information such as a threshold value for use to determine whether the measurement value of the water level gauge or others is of a normal value or an abnormal value, and based thereon, determines whether the measurement value is normal or abnormal.

Using text information or map information, for example, the central station 1 is capable of displaying, on the display section 11, the location of the monitor camera 3 in the range where the abnormal condition is occurred, the location of the terminal 2, the location of the river, and others.

Using the preset data indicating the information about the imaging composition, various types of command can be issued, e.g., control over the panning of a camera, the tilting of the camera, and a pan head of the camera, adjustment of the camera over an angle of elevation, adjustment of the camera over the scaling factor of a lens, and others.

Described next is exemplary screen display as a result of the control exercised by the central station 1 over the display section 11.

Figure 2:
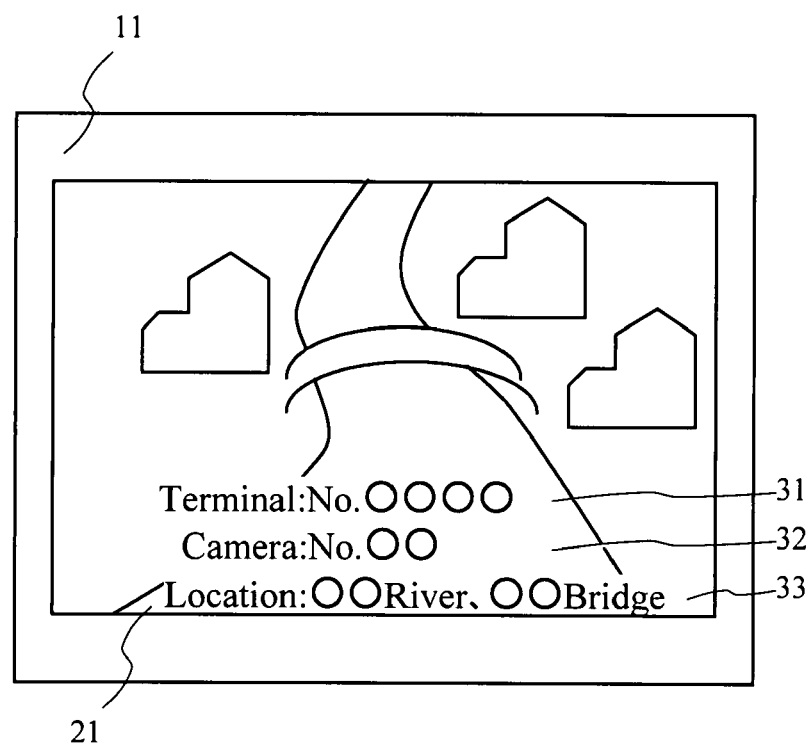
FIG. 2 is a diagram showing an exemplary display of image information.

FIG. 2 is showing an example in which a screen of the display section 11 is displayed thereon with the image information provided by the terminal 2, and an area 21 of the image is displayed therein with, all at once, information 31 of a terminal ID number (terminal No), information 32 of a camera ID number (camera No), and location information 33 of the imaging composition or others. Note here that, as the location information 33, used in this example is information about a name of a river or a bridge being a monitoring target for imaging.

In this example, based on the terminal ID number B1 included in the signal format data A1 for use by the central station 1 to call the terminal 2, and based on the preset data B3 indicating the information about the imaging composition of the monitor camera 3, the image area 21 of the display section 11 is displayed therein with, all at once, the information 31 of an identification number of the terminal 2 (terminal ID Number), the information 32 of an identification number of the monitor camera 3 (camera ID number), and the information 33 about the site of the image being captured by the monitor camera 3.

Figure 3:
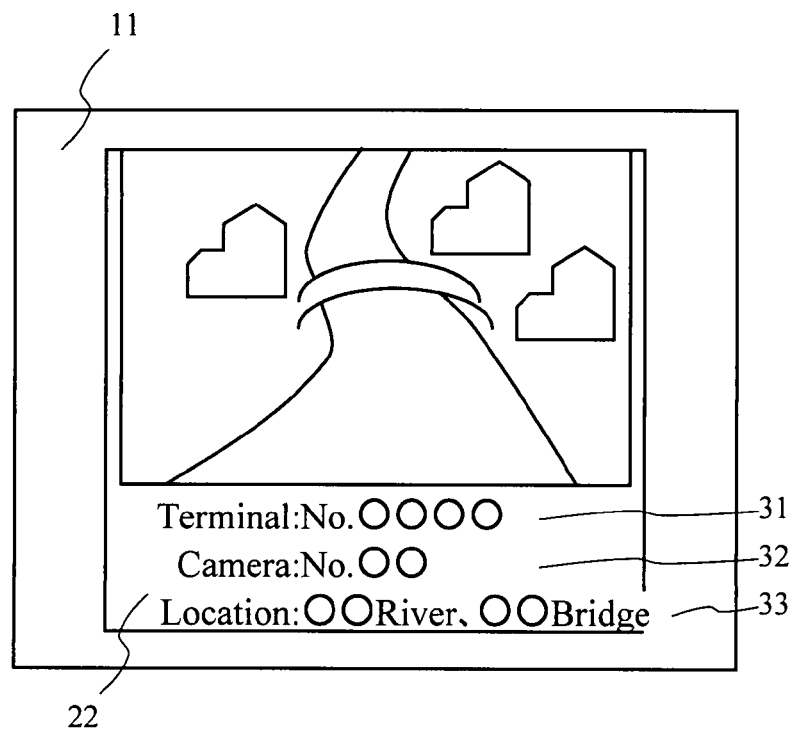
FIG. 3 is a diagram showing another exemplary display of the image information.

Moreover, FIG. 3 is showing an example in which the screen of the display section 11 is displayed thereon with the image information provided by the terminal 2, and an outside area 22 of the image is displayed therein with, all at once, the information 31 of a terminal ID number (terminal No), the information 32 of a camera ID number (camera No), and the location information 33 of the imaging composition or others.

Figure 4:
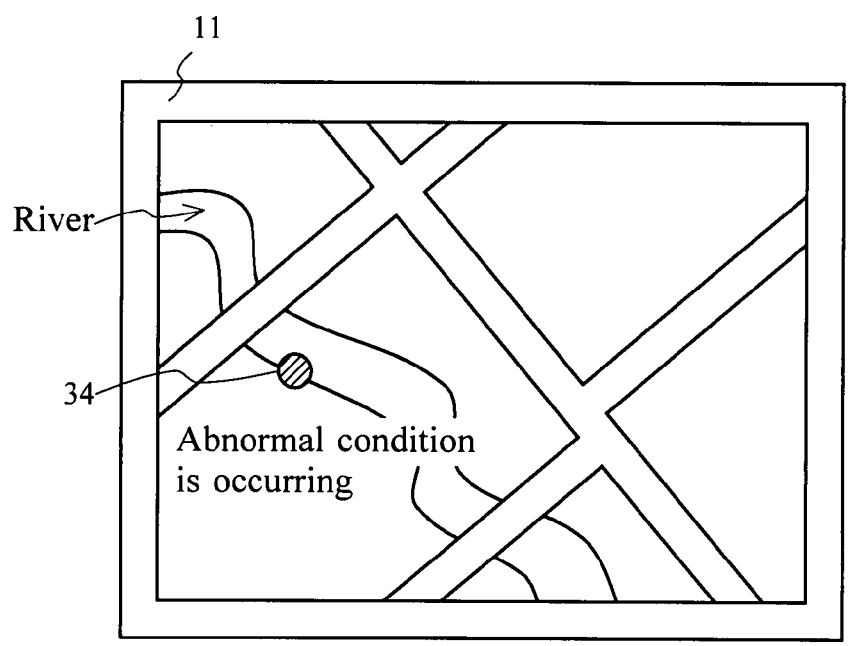
FIG. 4 is a diagram showing an exemplary display of location information about a camera.

FIG. 4 is showing an example in which, based on a signal provided by the terminal 2 to indicate the occurrence of an abnormal condition, and based on the terminal ID number of the terminal 2 and the camera ID number of the monitor camera 3, the screen of the display section 11 is displayed thereon with information about a map in the vicinity of the monitor camera 3 in charge of imaging the area where the abnormal condition occurs, and the map is displayed thereon with the information 34 indicating the location of the monitor camera 3. Also in this example, together with the information about the map including the location of the monitor camera 3, displayed are characters of "abnormal condition is occurring" to notify the occurrence of the abnormal condition. At the same time, a warning sound such as a beep, is given.

In the central station 1, for example, a memory is stored therein with information about the placement location of the terminals 2, and the information about the placement location of the monitor cameras 3. Based on such information, the information is specified for the location corresponding to the terminal ID number and the camera ID number. As another configuration example, using the function of GPS (Global Positioning System) or others, the terminals 2 and the monitor cameras 3 may be defined by location, or with also a possible configuration, the location information of the terminals 2 and the location information of the monitor cameras 3 may be notified from the terminals 2 to the central station 1 through transmission thereof.

As described in the foregoing, with the digital communications system of this example, at the time of collecting the image information, the central station 1 serving as a monitor station transfers the preset data indicating the information about the imaging composition of the monitor camera 3 using a control signal after the communications line is established with the terminal 2 serving as a monitored station. The central station also adds the preset data of the monitor camera 3 to a selection call signal (signal format data A1), which is to be sent out when the line is established with the terminal 2. This allows, when the central station 1 calls the terminal 2, the preset data to be transferred to the control section 12 of the monitor camera 3 at the terminal 2 end. For example, almost at the same time when the line is established with the terminal 2, the image corresponding to any needed preset data can be acquired for display on the display section 11.

Moreover, with the digital simultaneous Radio communication system of this example, a screen for displaying the collected image information is displayed thereon with, all at once, the terminal ID number, the camera ID number, and the location information such as the imaging composition. As a result, when the composition of the image is changed in response to the preset data sent out again, for example, a plurality of observers can share the location information of a site where the abnormal condition is occurring at the same time when the composition of the image is changed.

Also with the digital simultaneous Radio communication system of this example, at least one of a plurality of terminals is a camera station or a terminal connected to the camera 3. When an image is captured by the camera 3, information about thus captured image and the imaging composition information (preset information) at the time of imaging are both transmitted to the central station 1. After receiving the information, the central station 1 performs display with a correlation between the image information and the composition information thereof. This thus enables to notify viewers of the image information and the composition information thereof with a correlation therebetween.

Also with the digital simultaneous Radio communication system of this example, the camera 3 is connected with a telemeter, and when the telemeter detects the occurrence of an abnormal condition, the camera 3 captures an image thereof, and adds a signal indicating the abnormality of the telemeter to the image information for transmission to the central station 1. This enables to notify the viewers of the fact that the abnormal condition is occurring or the image information at this time.

Also with the digital simultaneous Radio communication system of this example, information based on the signal received from the terminal 2 to indicate the abnormality is displayed, and the map information including the location position of the camera 3 is displayed. As a result, when an abnormal condition occurs, the location position of the camera 3 can be notified visually easily.

Note here that at the terminal station device (terminal 2) end in this example, the imaging means is configured by the function of the monitor camera 3, the composition information management means is configured by the function of the control section 12, the terminal station transmission means is configured by the function of radio communications, and the telemeter means is configured by the function of a water level gauge or that of a telemeter.

Further, with the base station device 4 of this example, the base station reception means is configured by the function of radio communications.

Also at the center station (central station 1) end of this example, the display means is configured by the function of the display section 11, and the function of exercising control over the display section 11 for display information.

SECOND EXAMPLE

A second example of the invention is described.

Figure 5:
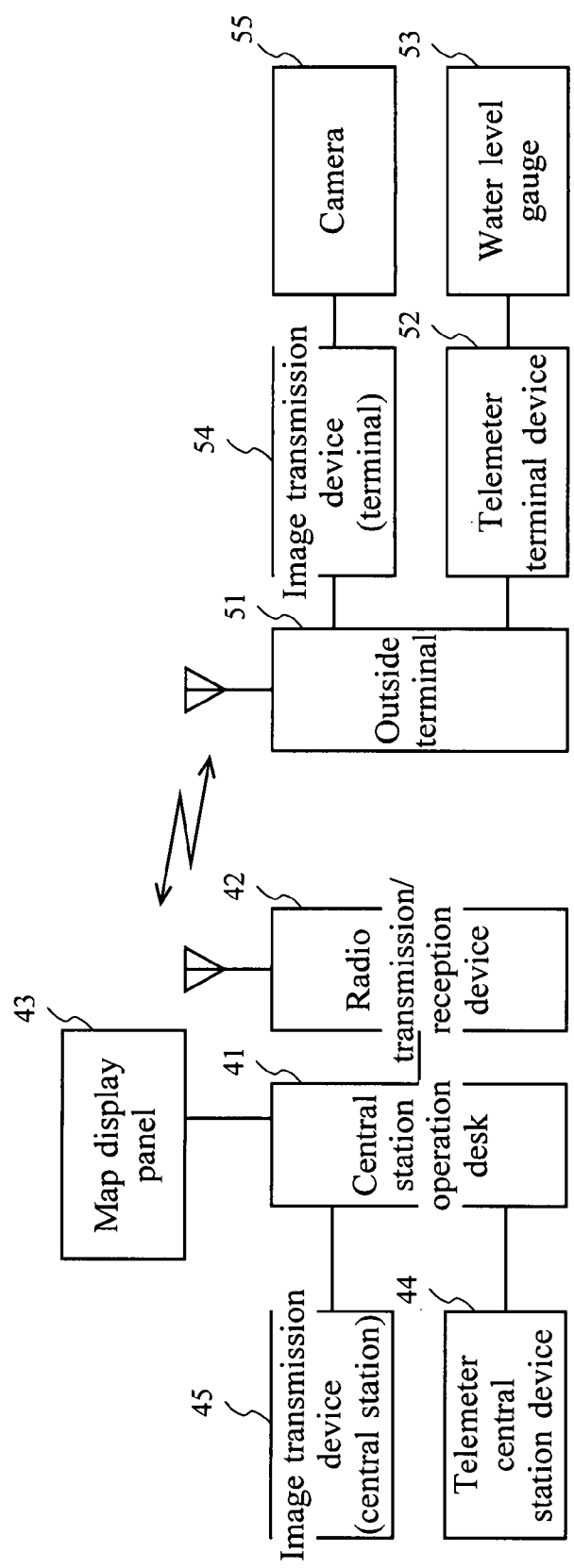
FIG. 5 is a diagram showing an exemplary configuration of a broadcast radio system according to a second example of the invention.

FIG. 5 is showing an exemplary configuration of a digital simultaneous Radio communication system of this example.

The digital simultaneous Radio communication system of this example is provided with, as a device at the central station (center station) end, a central station operation desk 41, a radio transmission/reception device (base station device) 42, a map display panel 43, the telemeter central station device 44, and an image transmission device 45.

The digital simultaneous Radio communication system of this example is also provided with, as a device at the terminal (terminal station) end, a terminal (outside terminal) 51 that is disposed outside as a home receiver, a telemeter terminal device 52, a water level gauge 53, an image transmission device 54, and a camera 55.

Herein, the water level gauge 53 is disposed to a drainage basin of a river that is likely to cause a water disaster if with any anomalous weather, for example. The gauge is put in such a river so as to measure the water level of the river.

Note that, as another configuration example, it is also possible to monitor the water level of a river using a camera by an ultrasonic system. Moreover, not only the water level of a river, various other information related to a weather and a disaster may be measured, e.g., the amount of rainfall at the time of typhoon or heavy downpour is measured using a rain gauge disposed outside.

In response when the operation section is operated by an operator (person), the central station operation desk 41 makes inputs of various information about the system, issues commands, and others. Note that, in this example, when an abnormal condition occurs, the central station operation desk 41 is capable of transmitting a signal to a predetermined terminal to notify that an abnormal condition is occurring.

The radio communications system 42 is capable of communicating, by radio, with the outside terminal 51, and implements the radio communications, through relaying, between the central station operation desk 41 and the outside terminal 51.

The map display panel 43 includes a screen, and displays and outputs the information about a map or others onto the screen. In this example, the information about a map including the location of the outside terminal 51 and the area therearound is stored in a memory of the map display panel 43 or that of the central station operation desk 41, and the information is used at the time of display of the map.

The telemeter central station device 44 has the function of the central station of a telemeter, and takes charge of processing the measurement information provided by the telemeter terminal device 52 or storage into the memory.

The image transmission device 45 at the central station end exchanges the image information with the image transmission device 54 at the terminal end, and the received image information is stored in the memory.

The outside terminal 51 communicates, by radio, various information with the radio transmission/reception device 42 at the central station end.

The telemeter terminal device 52 has the function of a terminal of the telemeter, and forwards measurement information derived by the water level gauge 53 to the telemeter central station device 44.

The water level gauge 53 measures the water level of a river being a monitoring target, and acquires the measurement information thereof.

The image transmission device 54 at the terminal end exchanges the image information with the image transmission device 45 at the central station end.

The camera 55 captures an image of a river being a monitoring target, and acquires the image information through such imaging.

Described next is an exemplary operation.

With activation by the telemeter central station device 44 connected to the central station operation desk 41, the outside terminal 51 is called via the central station operation desk 41 and the radio transmission/reception device 42. The outside terminal 51 called as such communicates with the telemeter terminal 52 connected to the outside terminal 51, and forwards back the measurement information derived by the water level gauge 53 (water level information in this example) to the radio transmission/reception device 42. The water level information from the outside terminal 51 is transmitted to the telemeter central station 44 via the central station operation desk 41 so that the water level information is recorded.

With activation by the image transmission device 45 connected to the central station operation desk 41, the outside terminal 51 is called via the central station operation desk 41 and the radio transmission/reception device 42. The outside terminal 51 called as such communicates with the image transmission device 54 connected to the outside terminal 51, and forwards back information about the image captured by the camera 55 to the radio transmission/reception device 42. The image information from the outside terminal 51 is transmitted to the image transmission device 45 via the central station operation desk 41 so that the image information is displayed and recorded.

Moreover, together with the locations of the outside terminals 51 scattered over the monitoring region (area), the map display panel 43 displays on its screen that any of those as being a calling target, monitoring state, or others by lamp display, for example.

Furthermore, described is an exemplary operation in a case where the water level measured by the water level gauge 53 exceeds a preset warning water level (threshold value).

In this case, the telemeter terminal 52 activates the outside terminal 51, and transmits the information about the warning water level to the central station end. After receiving the warning water level information, the telemeter central station device 44 transfers, to the map display panel 43 via the central station operation desk 41, an outside terminal number being the identification information of the outside terminal 51 and information indicating that the water level is exceeded. The map display panel 43 flashes a mark corresponding to the outside terminal position 51, for example, and informs people in the vicinity that the water level is exceeded there. At this time, a separately-provided warning sound issue device may give a warning sound.

Figure 6:
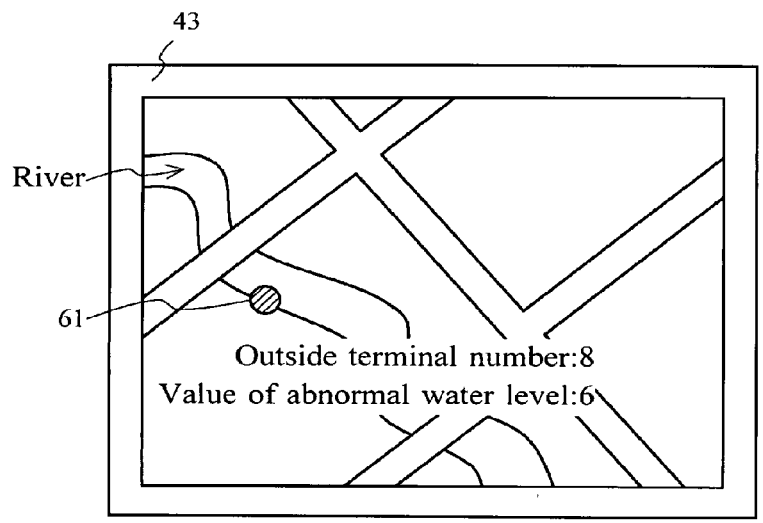
FIG. 6 is a diagram showing an exemplary display of location information about an outside terminal.
Figure 7:
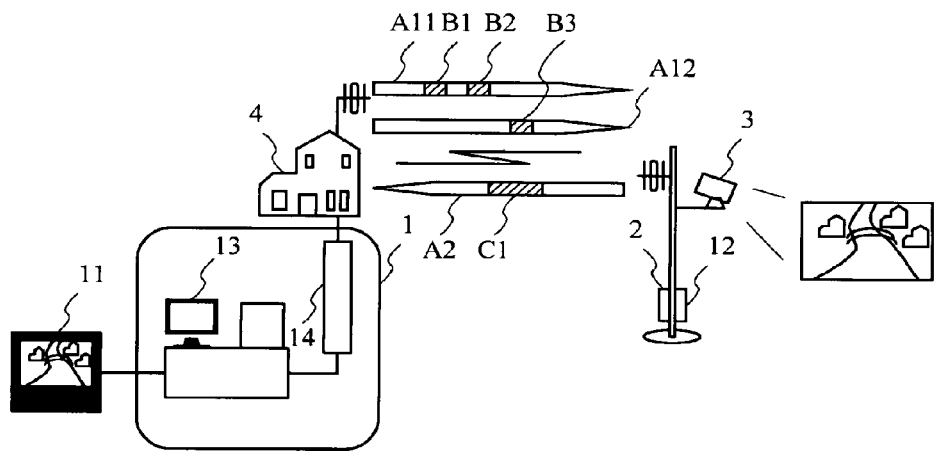
FIG. 7 is a diagram showing an exemplary configuration of a digital simultaneous Radio communication system.

Here, FIG. 6 shows an example in which information about a map around the outside terminal 51 having detected an abnormal condition is displayed on the screen of the map display panel 43, information 61 indicating the location of the outside terminal 51 is displayed flashing on the map, or information about the outside terminal number of the outside terminal 51 or a value of the measurement information when the abnormal condition occurs (a value of the water level in this example) is displayed.

Moreover, when an operator goes through a selection operation by double clicking or others after moving a pointer on the screen of the map display panel 43 to the location of the outside terminal 51 being a target, the radio transmission/reception device 42 is activated via the central station operation desk 41, and the image transmission device 54 and the camera 55 at the terminal end are activated via the outside terminal 51. The camera 55 transmits information about a captured image to the central station end via the image transmission device 54 and the outside terminal 51 both at the terminal end. This image information is transmitted to the image transmission device 45 at the central station end via the radio transmission/reception device 42 and the central station operation desk 41, and is displayed on a monitor screen provided to the central station operation desk 41, the image transmission device 45 at the central station end, and others.

As such, with the digital simultaneous Radio communication system of this example, at least one of a plurality of outside terminals 51 is a telemeter station, or a terminal connected to the telemeter terminal device 52. At the central station end, a display section (the map display panel 43 in this example) is provided for displaying map information indicating the location of the outside terminal having a telemeter function. When the outside terminal 51 having the telemeter function detects any occurrence of an abnormal condition using the telemeter function, a signal indicating the fact that the abnormality is detected is forwarded to the central station end. Upon reception, the central station end makes the display section display thereon the map information indicating the location of the outside terminal 51. This enables to visually easily notify, using the map information, information about the outside terminal 51 having detected the occurrence of an abnormal condition and about the area therearound.

Moreover, in this example, after receiving the signal indicating the abnormality, the central station end transmits a signal to a predetermined terminal station device (terminal) to notify the fact that the abnormal condition occurs. This enables to notify users using predetermined terminal devices that an abnormal condition is occurring. Note that the predetermined terminal station devices being targets for notification of the occurrence of an abnormal condition may vary in type, and as an example, the central station end may be set in advance with identification information about the terminals.

Further, in this example, together with the information based on the signal indicating the abnormality received at the central station end, the display section is made to display thereon map information including the location of the outside terminal 51 notifying the abnormality. This accordingly enables to notify, at the time of notification of the occurrence of an abnormal condition, the map information about the site of the occurrence and the area therearound. Note that the information based on the signal indicating the abnormality may be any notified abnormal measurement value (a value of any abnormal water level in this example), image information about the site (location where the abnormal water level is observed in this example), and others.

Also, in this example, in the configuration of including the central station operation desk 41, the radio transmission/reception device 42, a plurality of outside terminals 51, the map display panel 43 displaying on the map the location of the outside terminal 51 and any related information, and others, the telemeter central station device 44 connected to the central station operation desk 41 calls the telemeter terminal device 52 connected to the outside terminal 51 via the central station operation desk 41 and the radio transmission/reception device 42, and information about the water level gauge 53 connected to the telemeter terminal device 52 is acquired into the telemeter central station device 44. This serves effectively to take measurements for possible disaster by making the function of the telemeter work together with the function of the master-slave communications.

Also in this example, when the water level measured using the water level gauge 53 exceeds a certain value, the outside terminal 51 is automatically activated, and the water level warning information is transmitted to the central station end. The location of the outside terminal 51 transmitting the water level warning information is then displayed flashing on the map display panel 43. This serves effectively to take measurements for possible disaster through cooperation of functions, i.e., the function of abnormality detection, the function of a telemeter, the function of master-slave communications, and the function of map display.

With the digital simultaneous Radio communication system in this example, the outside terminal 51 having the telemeter function or any other outside terminal is connected to the camera 55. When an occurrence of an abnormal condition is detected, information about an image (video) captured by the camera 55 is automatically transmitted to the central station end, and the display section at the central station end is displayed with information indicating as being the outside terminal 51 having detected the occurrence of the abnormal condition, and the map information indicating the location of the outside terminal 51. This serves effectively to take measurements for possible disaster through cooperation of functions, i.e., the function of abnormality detection, the function of a camera, the function of master-slave communications, and the function of information display.

Also in this example, through selection of a location corresponding to the outside terminal 51 on the map display panel 43, the image transmission device 45 connected to the central station operation desk 41 at the central station end is activated for a calling operation. In response, the image information coming from the image transmission device 54 connected to the selected outside terminal 51 at the terminal end is displayed on the screen of the image transmission device 45 or others at the central station end. This serves effectively to take measurements for possible disaster through cooperation of functions, i.e., the function of map display, the function of master-slave communications, and the function of image transfer.

As such, with the digital simultaneous Radio communication system in this example, two or more of the components are made to work together, e.g., the central station operation desk 41, the telemeter central station device 44, the image transmission device 45 at the central station end, and the map display panel 43, or the outside terminal 51, the telemeter terminal device 52, and the image transmission device 54 at the terminal end. With a cue from the central station end or a cue from the terminal end, the measurement information derived by the water level gauge 53 or the image information derived by the camera 55 is displayed on the map display panel 43 or others.

Accordingly, in this example, it is possible to implement, automatically or with a simple operation, immediate finding of warning information, notification of a site where the warning water level is exceeded, notification of the site by image, notification of the image information about the area around the site, and others.

Note that, at the end of the terminal station device (the outside terminal 51) in this example, the telemeter means is configured by the water level gauge 53 and the function of the telemeter terminal device 52, and the terminal station transmission means is configured by the function of radio communications. Moreover, at the end of the terminal station device (the outside terminal 51) in this example, the imaging means is configured by the function of the camera 55, and the composition information management means is configured by the function of the camera 55, the image transmission device 54, or others.

Moreover, with the base station device (radio transmission/reception device 42) in this example, the base station reception means is configured by the function of radio communications.

At the end of the center station (central station) in this example, the display means is configured by the function of the map display panel 43, and the function of exercising control over the map display panel 43 to display thereon map information or others. The center station transmission means is configured by the function of transmitting information to any predetermined terminal station device.

Herein, the radio communications system and the communications station device (e.g., the central station, the base station device, and the terminal) of the invention are not necessarily restricted in configuration as those described above, and may vary in configuration. Further, the invention can be offered as a method or scheme of executing the processes of the invention, or as a program of implementing such a method and scheme, or as a recording medium for recording the program. Still further, the invention can be offered as various types of devices and systems.

Moreover, the application field of the invention is not necessarily restrictive to those described above, and the invention can be applied to various types of fields.

Moreover, various types of processes to be executed in the radio communications system, the communications station device (the central station, the base station device, and the terminal) of the invention may be so configured as to be controlled by a processor running a control program stored in a ROM (Read Only memory) in hardware resources including a processor, a memory, or others, for example. As an alternative configuration, various types of function means for executing the processes may be configured as each different hardware circuit.

Further, the invention can be understood as being a recording medium readable by a computer such as a floppy (trademark) disk with the above-described control program stored therein, a CD (Compact Disc)-ROM, or others, and or the program (itself). By the processor executing the control program input from the recording medium to the computer, the processes of the invention can be executed.

As described in the foregoing, according to a radio communications system of the invention, for example, at a terminal station device end, an image is captured, information related to the imaging composition is managed, and information about the captured image and the information about the composition are transmitted by radio. At a center station end, the image information and the information about the composition provided by the terminal station device are displayed with a correlation therebetween. It thus becomes able to show the full effect for responding to the event of a disaster.

According to the radio communications system of the invention, for example, at the terminal station device end, when an occurrence of any predetermined abnormal condition is detected, information indicating the occurrence of the abnormal condition is transmitted by radio. At the center station end, when information indicating the occurrence of the abnormal condition is provided by the terminal station device, information about a map indicating the location related to the occurrence of the abnormal condition is displayed so that it is possible to show the full effect for responding to the event of a disaster, or others.

The invention claimed is:

1. A radio communications system comprising:
a center station;
a base station device connected to the center station; and
a terminal station device configured to communicate, by radio, with the base station device, wherein
the terminal station device comprises a telemeter means for detecting an occurrence of a predetermined abnormal condition, an imaging means for capturing an image related to the occurrence of the abnormal condition in response to the detection of the occurrence of the abnormal condition, a composition information management means configured to manage information about a composition for imaging performed by the imaging means, the information about the composition for imaging performed by the imaging means including at least one of at least information about the orientation of the imaging means and information about a scaling factor of a lens, and a terminal station transmission means for transmitting, by radio, to the base station device, information about the captured image related to the occurrence of the abnormal condition, wherein
the base station device includes a base station transmission/reception means for transmitting/receiving a signal to/from the center station, and for transmitting/receiving, by radio, a signal to/from the terminal station device, wherein
the center station includes a communication control means for transmitting the information about the composition for imaging by the imaging means including at least the orientation of the imaging means or a scaling factor of a lens to the terminal station device, and a display means for displaying, based on the information received by the base station device, the information on the image transmitted from the terminal station device;
the terminal station device includes a control means for adjusting the composition of the imaging means to the composition specified by the information about the composition for imaging received from the center station;
the communication control means in the center station adds preset data including collection request data of image information and the information about the composition for imaging by the imaging means in addition to the ID number of the terminal station device to a call signal for calling the terminal station device when the communication control means calls the terminal station device; and
the terminal station device transmits the information about the composition for imaging to the control unit in response to the recognition of the collection request data in the preset data if the ID number included in the received call signal matches the ID number of the terminal station device.

2. The radio communications system according to claim 1, wherein
based on the information received by the base station device, the display device of the center station displays information about the occurrence of the abnormal condition, and information about a map including a site related to the occurrence of the abnormal condition.

3. The radio communications system according to claim 1, wherein
the communications control means of the center station adds information about an imaging composition of the imaging means to a selection call signal which is to be sent out when a line is established with the terminal station device.

4. The radio communications system according to claim 1, wherein
the terminal station transmission means of the terminal station device transmits the information about the composition with the information about the captured image, and
the display device of the center station, based on the information about the composition received from the terminal station transmission means, displays the name of the target for imaging.

5. The radio communications system according to claim 1, wherein
the information about the composition communicated by the center station and the terminal station device is preset data.

6. The radio communications system according to claim 1, wherein
the communication control means in the center station automatically adds the preset data when a line is established with the terminal station device.

* * * * *